United States Patent
Majmundar et al.

(10) Patent No.: US 11,102,703 B2
(45) Date of Patent: Aug. 24, 2021

(54) ENHANCED HANDOVER PROCEDURE TO FACILITATE ROUTE CHANGE IN AN IAB NETWORK

(71) Applicant: AT&T Intellectual Property I, L.P., Atlanta, GA (US)

(72) Inventors: Milap Majmundar, Austin, TX (US); Andrew Thornburg, Austin, TX (US); Thomas Novlan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/059,410

(22) Filed: Aug. 9, 2018

(65) Prior Publication Data

US 2020/0053629 A1 Feb. 13, 2020

(51) Int. Cl.
*H04W 40/36* (2009.01)
*H04W 36/00* (2009.01)
*H04W 88/16* (2009.01)
*H04W 36/02* (2009.01)

(52) U.S. Cl.
CPC ....... *H04W 40/36* (2013.01); *H04W 36/0027* (2013.01); *H04W 36/0061* (2013.01); *H04W 36/023* (2013.01); *H04W 88/16* (2013.01)

(58) Field of Classification Search
None
See application file for complete search history.

(56) References Cited

U.S. PATENT DOCUMENTS

| 10,009,260 | B2 | 6/2018 | Hampel et al. | |
| 2008/0043637 | A1* | 2/2008 | Rahman | H04L 45/22 370/254 |
| 2011/0080891 | A1* | 4/2011 | Cai | H04W 36/0033 370/331 |
| 2014/0269402 | A1* | 9/2014 | Vasseur | H04L 41/0659 370/253 |

(Continued)

OTHER PUBLICATIONS

Islam, Muhammad Nazmul, et al. "Investigation of Performance in Integrated Access and Backhaul Networks." arXiv preprint arXiv:1804. 00312 (2018). 6 pages.

(Continued)

*Primary Examiner* — Saad Khawar
(74) *Attorney, Agent, or Firm* — Amin, Turocy & Watson, LLP

(57) ABSTRACT

An enhanced handover procedure is provided to facilitate communication routing changes in an integrated access and backhaul (IAB) network. In an IAB network a network node can be connected to the core network via multiple different paths, and when the path changes, (e.g., when an intermediate network node performs a handover procedure with another network node), messages can be sent to relevant network nodes informing them of the route change so as to reduce the number of protocol data units (PDUs) that are transmitted to network nodes that are no longer part of the communication path to the target network node. The network node that is no longer part of the communication path can also inform a parent node of which PDUs have been successfully transmitted to the target network node so that the parent node can retransmit the PDUs that were not transmitted successfully.

20 Claims, 10 Drawing Sheets

(56) References Cited

U.S. PATENT DOCUMENTS

| | | | |
|---|---|---|---|
| 2016/0099865 A1* | 4/2016 | Klincewicz | H04L 45/28 370/218 |
| 2017/0006499 A1 | 1/2017 | Hampel et al. | |
| 2018/0013685 A1 | 1/2018 | Yu et al. | |
| 2018/0049190 A1 | 2/2018 | Abedini et al. | |
| 2018/0091416 A1 | 3/2018 | Ghosh et al. | |
| 2018/0092139 A1 | 3/2018 | Novlan et al. | |
| 2018/0115990 A1 | 4/2018 | Abedini et al. | |
| 2019/0372887 A1 | 12/2019 | Majmundar et al. | |
| 2020/0112879 A1* | 4/2020 | Shimoda | H04L 1/16 |

OTHER PUBLICATIONS

Polese, Michele, et al. "End-to-End Simulation of Integrated Access and Backhaul at mmWaves." 2018 IEEE International Workshop on Computer-Aided Modeling Analysis and Design of Communication Links and Networks (CAMAD), Sep. 2018. arXiv:1808.00376v1 [cs.Nl] Aug. 1, 2018. 8 pages.

3GPP TS 38.475, https://portal.3gpp.org/desktopmodules/Specifications/SpecificationDetails.aspx?specificationId=3262, 2017, 1 page.

RP-170821, Study on Integrated Access and Backhaul for NR, AT&T, Qualcomm, Samsung, 1 page.

* cited by examiner

ENHANCED HANDOVER PROCEDURE TO FACILITATE ROUTE CHANGE IN AN IAB NETWORK

TECHNICAL FIELD

The present application relates generally to the field of mobile communications and, for example, to an improved handover procedure to facilitate communication path changes in an integrated access and backhaul network in a next generation wireless network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
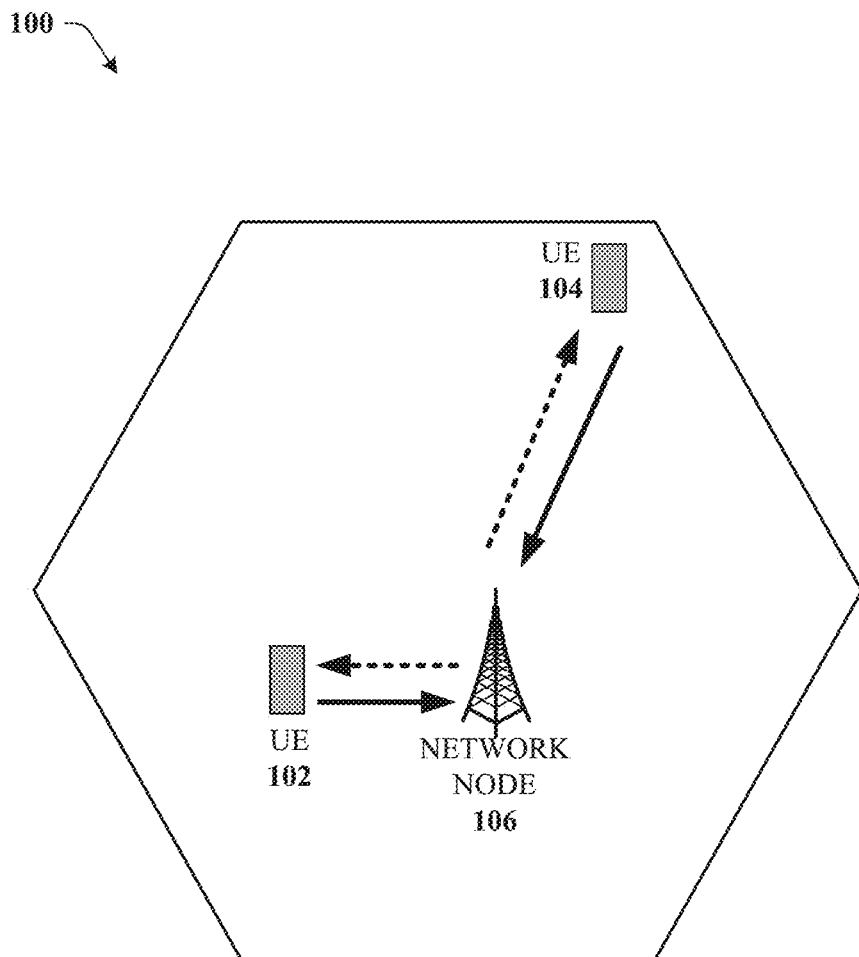
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for an enhanced handover procedure to facilitate communication routing changes in an integrated access and backhaul (IAB) network. In an IAB network a network node can be connected to the core network via multiple different paths, and when the path changes, (e.g., when an intermediate network node performs a handover procedure with another network node), messages can be sent to relevant network nodes informing them of the route change so as to reduce the number of protocol data units (PDUs) that are transmitted to network nodes that are no longer part of the communication path to the target network node. The network node that is no longer part of the communication path can also inform a parent node of which PDUs have been successfully transmitted to the target network node so that the parent node can retransmit the PDUs that were not transmitted successfully.

In various embodiments a centralized unit device can comprise a processor and a memory that stores executable instructions that, when executed by the processor, facilitate performance of operations. The operations can include determining to facilitate initiation of a handover of a first communication channel to a source network node device from a first network node device to a second network node device, wherein the first network node device and the second network node device are donor node devices of the source network node device. The operations can also include transmitting a message to a third network node device that is a parent node device of the first network node device and the second network node device in a hierarchical group of network node devices, wherein the message comprises an instruction to the third network node device to forward data directed to the source network node device via the second network node device.

In various embodiments a core network device can comprise a processor and a memory that stores executable instructions that, when executed by the processor, facilitate performance of operations. The operations can include determining that a communication channel with a target network node device has been transferred to a second relay node device, wherein the first relay node device and the second relay node device are intermediate devices in an integrated access and backhaul network. The operations can also include identifying a first protocol data unit received from a donor node device that was successfully transmitted to the target network node device before the communication channel with the target network node device was transferred. The operations can also include transmitting a delivery status message to the donor node device indicating a sequence number of the first protocol data unit, wherein the delivery status message facilitates the donor node device retransmitting, to the second relay node device, a second protocol data unit that was not successfully transmitted to the target network device by the first relay node device.

In another embodiment, a method can include facilitating, by a first relay node device comprising a processor, receiving a delivery status message from a second relay node device, wherein the delivery status message indicates a sequence number of a first protocol data unit that was successfully transmitted by the second relay node device to a target network node device. The method can also include determining, by the first relay node device, a second protocol data unit that was not successfully transmitted before handover of a communication channel with the target network node device from the second relay node device to a third relay node device. The method can also include facilitating, by the first relay node device, transmitting the second protocol data unit to the third relay node device to facilitate transmission of the second protocol data unit by the third relay node device to the target network node device.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, network node 106 can be part of an integrated access and backhaul network. This may allow easier deployment of a dense network of self-backhauled NR cells in a more integrated manner by building upon many of the control and data channels/procedures defined for providing access to UEs.

Figure 2:
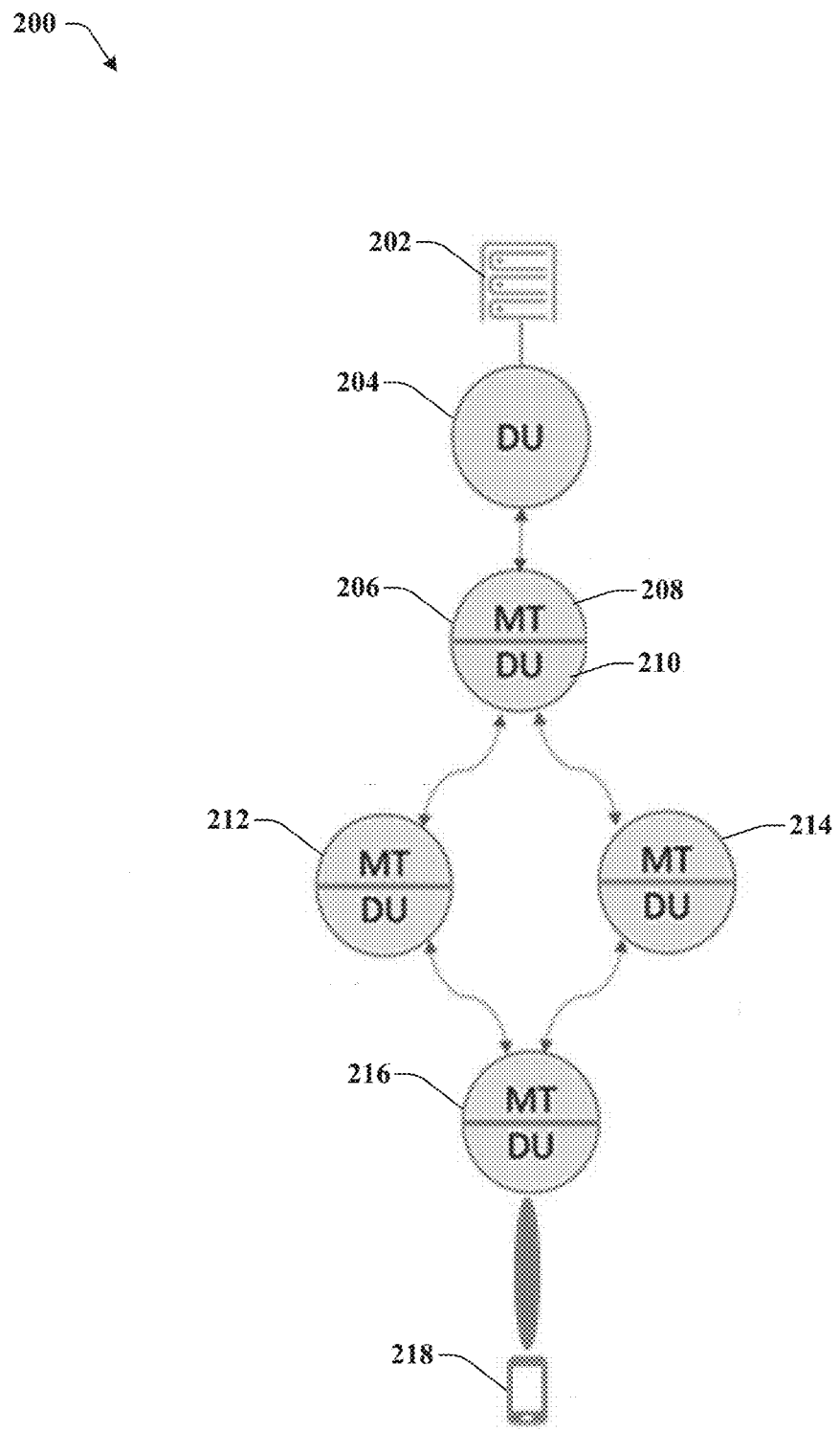
FIG. 2 illustrates an example multi-hop integrated access and backhaul network in accordance with various aspects and embodiments of the subject disclosure.

An example of an integrated access and backhaul network can be provided as shown in FIG. 2. FIG. 2 illustrates an example of a multi-hop integrated access and backhaul network 200 in accordance with various embodiments disclosed herein. A centralized unit (CU) network device 202 can be communicably coupled to a core network (not shown), and also provide a backhaul connection for a donor/distributed unit network node 204. There can be a plurality of intermediate network nodes (e.g., network node 206, 212, 214, and 216) via which the user equipment device 218 communications with the core network.

Due to the expected larger bandwidth available for NR (New Radio, or 5G) compared to LTE (e.g. mmWave spectrum) along with the native deployment of massive MIMO or multi-beam systems in NR, there is now an opportunity to develop and deploy integrated access and backhaul links. This may allow easier deployment of a dense network of self-backhauled NR cells in a more integrated manner by building upon many of the control and data channels/procedures defined for providing access to UEs.

For densely deployed mmWave NR systems, the area covered by an NR node can be quite small, so a dense deployment of NR nodes in a given area could implicate a significantly larger number of deployment sites. When an IAB network is deployed in such an environment with sparse fiber deployment, the large number of deployment sites creates a deployment where multiple IAB hops are used to reach the IAB donor node (IAB donor has access to fiber). This means that for each UE bearer, a particular route through the multi-hop network is determined. Moreover, when channel or network conditions change dynamically, this route through the multi-hop IAB network correspondingly changes. This is illustrated in FIG. 2, where the communication path to UE 218 from the CU 202 or DU 204 can be provided either via node 206, node 212 and node 216, or via node 206, node 214, and node 216. It is to be appreciated that while FIG. 2 depicts two different path possibilities, in other embodiments, other numbers and combinations of path possibilities are possible given the distribution of IAB network nodes and the various hop orders (number of hops from the CU 202).

The IAB network nodes can have separate logical functions that are collocated. A UE stack or UE Function (MT) can establish communications with the parent node (e.g., donor node) and a GNB stack (DU) can establishes communication with the child node or UEs. To a donor node device 204, the relay node device 206 appears as a UE device as the MT 208 recreates the functions of a UE device, and to a child node device 212 or 214, the relay node device 206 appears as a gNodeB or base station device due to the interaction with the DU 210. The link between the MT 208 and the parent node DU 204 can be referred to as a backhaul link, while the link between the DU 210 and the child network nodes 212 and 214 can be referred to as an access link.

In an IAB network where IAB nodes can support single connectivity, route changes can be performed using handover procedures. FIG. 2 shows an example IAB network, where at each relay hop the UE stack of the IAB node, called MT, is wirelessly connected to a DU to form the relay link. From a radio connectivity perspective, the MT acts just a regular UE, performing radio resource management (RRM) measurement and reporting. Similarly, when RRM measurements indicate that, the network may handover the MT from one DU to another. For example, the MT of IAB Node 216 could be handed over from the DU of IAB node 212 to the DU of IAB Node 214 using a handover procedure.

When the handover is performed however, according to the current handover protocol, the DU 210 of network node 206 may not know that the handover has occurred, and may still continue to send protocol data units to network node 212 that are directed towards the target/source network node 216 and UE 218. Since the handover has occurred, these PDUs are not able to be sent by the network node 212 to the network node 216. Therefore, the enhanced handover procedure disclosed herein provides a mechanism to inform network node 206 of the handover, as well as enabling network node 206 to retransmit any PDUs that were not sent by network node 212 to network node 216.

Two primary enhancements are disclosed herein. First, an enhancement of the handover procedure is provided to prevent unnecessary forwarding of data from parent IAB node (e.g., node 206) to source IAB node (e.g., node 216 via node 212) during execution of handover. Secondly, introduction of new peer-to-peer IAB node data delivery status reporting mechanism to recover undelivered PDUs upon handover.

The handover may be triggered by an IAB topology manager component located at the CU 202 or based on radio resource management measurement reports. As an example, if the load of network node 212 is higher than a predetermined load, the network can initiate handover of one or more radio bearers to network node 214. In other embodiments, based on the signal to noise ratio or other measurement reports, the topology manager may determine that it can be more efficient to transfer one or more bearers to network node 214 from network node 212.

In an embodiment, an RRM measurement report can be sent from the target/source IAB node 216 to the CU 202 via network nodes, 216, 212, 206, and DU 204. The measurement report can inform the CU 202 about network conditions between the network node 216 and network node 212 as well as with the UE 218. Based on the measurement report, the CU 202 can determine whether to instruct network node to handover the communication channel with network node 216 to network node 214, and can inform network node 214 of the decision to initiate the handover procedure. The CU 202 can also send a trigger to the network node 216 of the decision to handover. The CU 202 can inform the network nodes of the decision to handover via the communication path shown in FIG. 2, e.g., via DU 204, network node 206, 212, and etc., or the CU 202 can use an alternative means to inform the network nodes 216 and 214 (e.g., via an existing LTE network or other signaling mechanism).

CU 202 can also send a message to all intermediate network nodes (e.g., DU 204, network node 206 in order to instruct them to stop forwarding data to the network node 216 via network node 212 to prevent further accumulation of data along a relay path that may be about to change. In an embodiment, the intermediate IAB DUs and/or donor DU that are instructed to stop forwarding data depend upon differences between the old relay path and the new relay path.

As the handover procedure proceeds, the MT of network node 216 can detach and attach to the DU of network node 214, and then the CU 202 can be informed, and data forwarding to network node 216 can be via the new path/ route from DU 204, to network node 206 then network node 214.

A data delivery status PDU can be transmitted from network node 212 to network node 206 where the data delivery status PDU can list a sequence number of each of the PDUs that were successfully transmitted to network node 216. Based on the list, the network node 206 can compare the PDUs that were transmitted to network node 216 via network node 212, and then identify PDUs that were sent to network node 212 and which were not successfully transmitted to network node 216. The network node 206 can retrieve these PDUs from a buffer on the network node 206 (via the sequence number) and retransmit the PDUs to network node 214.

This delivery status PDU may be defined either at the RLC layer or at a new Adaptation layer being proposed in 3GPP. Upon reception at the parent IAB node 206, the parent IAB node 206 may use the delivery status information to forward stored data PDUs to the target IAB node 216 via IAB network node 214. Additionally, the network node 206 can also forward the data delivery status PDU to its parent node, DU 204. This data delivery status PDU procedure is equally applicable to both downlink and uplink data flows.

In an embodiment, the CU 202 can then transmit a route update message to all relevant IAB network nodes. In the case of a successful handover, the route update message can provide the new route and release stopped IAB nodes to start forwarding data on the new route. If on the other hand, the handover fails, the route update message can inform the network nodes to retain the old route, and releases the stopped IAB network nodes to start forwarding data on the old route.

Several benefits of this enhanced handover procedure in the IAB network include the prevention of unnecessary data forwarding and potential loss of data upon handover of an intermediate IAB node from one parent IAB node to another parent IAB node. Additionally, it provides a solution to allow recovery of undelivered PDUs from the source IAB node to the target IAB node to prevent loss of data upon handover of an intermediate IAB node from one parent IAB node to another parent IAB node.

In an embodiment, network nodes 212 and 214 are of the same hop order (i.e., distance/network hops) from the core network, while network node has a hop order of +1 relative to network node 206. In other embodiments, network nodes 212 and 214 can have a different hop order depending on the IAB topology and location and network conditions of the network nodes.

Figure 3:
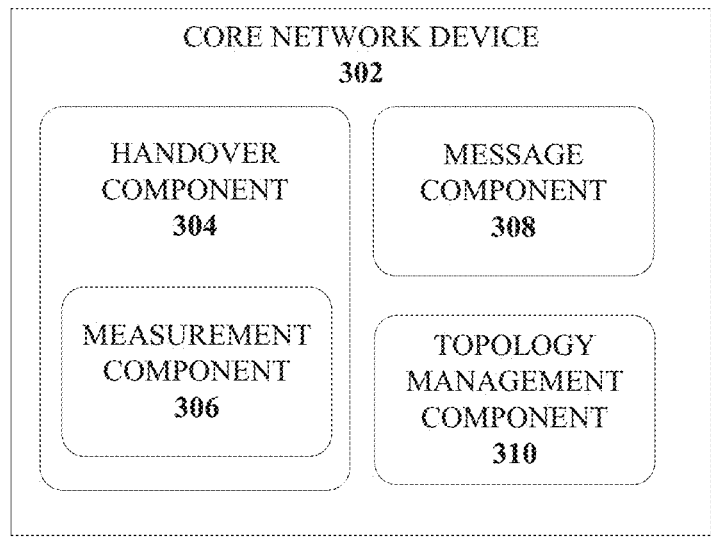
FIG. 3 illustrates an example block diagram of a core network device in accordance with various aspects and embodiments of the subject disclosure.

Turning now to FIG. 3, illustrated is an example block diagram of a core network device in accordance with various aspects and embodiments of the subject disclosure.

In an embodiment, core network device 302 can correspond to CU 202 from FIG. 2. Core network device 302 can include a handover component 304 that can determine to facilitate initiation of a handover of a first communication channel to a source network node device from a first network node device to a second network node device, wherein the first network node device and the second network node device are donor node devices of the source network node device. The handover component can also include a measurement component 306 that can receive a measurement report from the target/source network node and determine whether a handover is desirable. In another embodiment, the handover decision can be performed by topology management component 310 which can manage the communications routes in the IAB network, and can determine which route to adjust based on the measurement reports and loads of the network nodes, scheduled downtime, and other pertinent information.

A message component 308 can be included to transmit a message to a third network node device that is a parent node device of the first network node device and the second network node device in a hierarchical group of network node devices, wherein the message comprises an instruction to the third network node device to forward data directed to the source network node device via the second network node device. In another embodiment, the message component 308 can, in response to determining that the handover was successful, transmit a route update message indicating a first communication path to the source network device and instructing a stopped network node to start forwarding data to the source network node device via the new communication path. The message component 308 can also, in response to determining that the handover failed, transmit a route update message instructing a stopped network node to start forwarding data to the source network node device via a second communication path.

Figure 4:
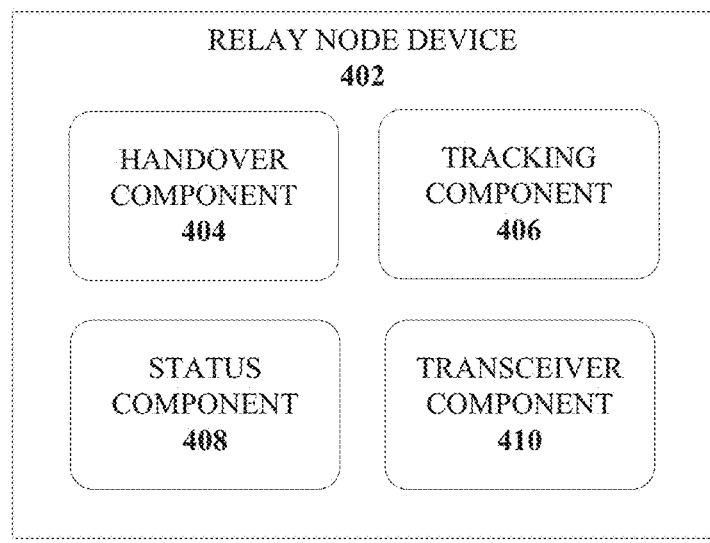
FIG. 4 illustrates an example block diagram of a relay network device in accordance with various aspects and embodiments of the subject disclosure.

Turning now to FIG. 4, illustrated is an example block diagram of a relay node device 402 (corresponding to network node 212) in accordance with various aspects and embodiments of the subject disclosure.

Relay node device 402 can include a handover component 404 that can receive, via transceiver component 410, a message from the CU indicating that a handover has been performed. Based on this the handover component 404 can determine that a communication channel with a target network node device has been transferred to a second relay node device, wherein the first relay node device and the second relay node device are intermediate devices in an integrated access and backhaul network.

A tracking component 406 can identify a first protocol data unit received from a donor node device that was successfully transmitted to the target network node device before the communication channel with the target network node device was transferred.

A status component 408 can transmit a delivery status message (via transceiver component 410) to the donor node device indicating a sequence number of the first protocol data unit, wherein the delivery status message facilitates the donor node device retransmitting, to the second relay node device, a second protocol data unit that was not successfully transmitted to the target network device by the first relay node device.

Figure 5:
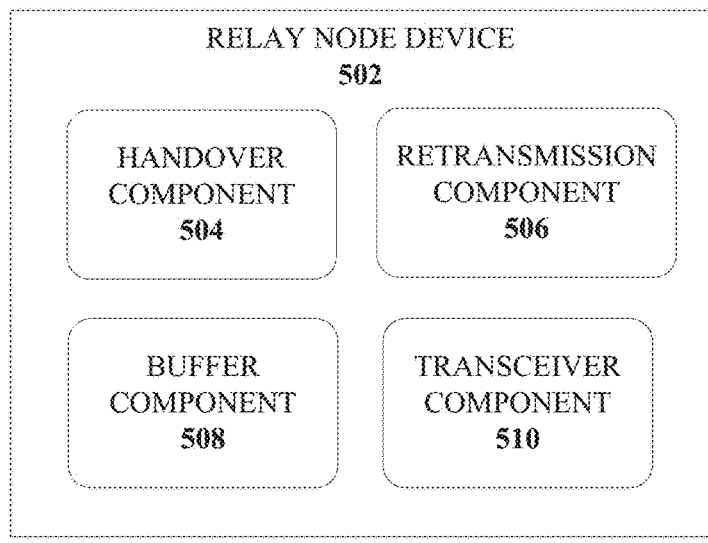
FIG. 5 illustrates an example block diagram of another relay network device in accordance with various aspects and embodiments of the subject disclosure.

Turning now to FIG. 5, illustrated is an example block diagram of another relay network device (corresponding to network node 206) in accordance with various aspects and embodiments of the subject disclosure. Relay node device 502 can include a handover component 504 performs a handover with another network node. The transceiver component 510 can receive a delivery status message from a second relay node device, wherein the delivery status message indicates a sequence number of a first protocol data unit that was successfully transmitted by the second relay node device to a target network node device.

The retransmission component 506 can determine, based on the delivery status message, a second protocol data unit that was not successfully transmitted before handover of a communication channel with the target network node device from the second relay node device to a third relay node device. The retransmission component 506 can retrieve the second protocol data unit from a buffer component 508 that stores PDUs for a predetermined period of time. The retransmission component 506 can then, via the transceiver component 510, transmit the second protocol data unit to the third relay node device to facilitate transmission of the second protocol data unit by the third relay node device to the target network node device. The transceiver component 510 can also forward the delivery status message to a parent node device.

Figure 6:
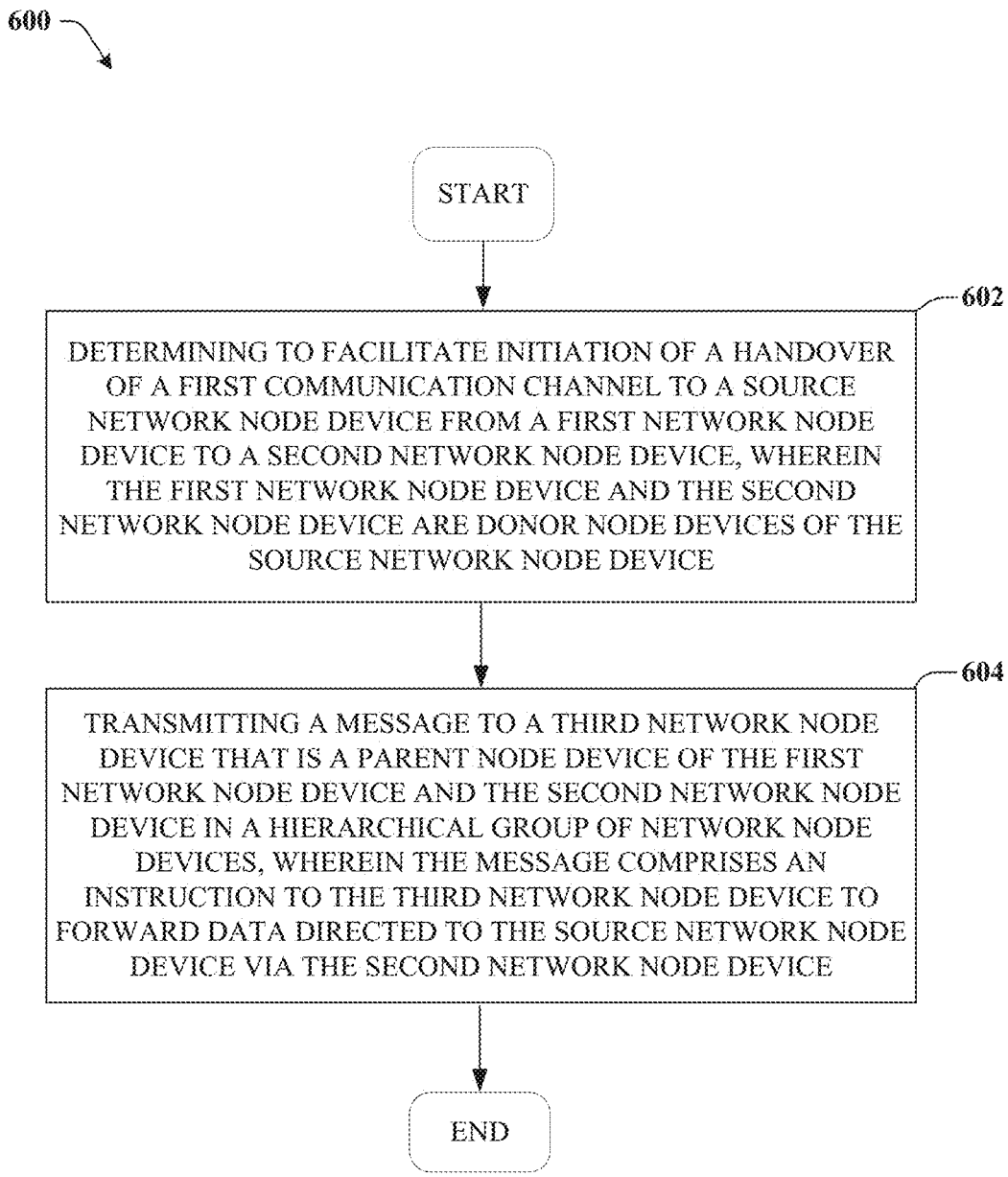
FIG. 6 illustrates an example method for applying facilitating route changes in an integrated access and backhaul network in accordance with various aspects and embodiments of the subject disclosure.
Figure 7:
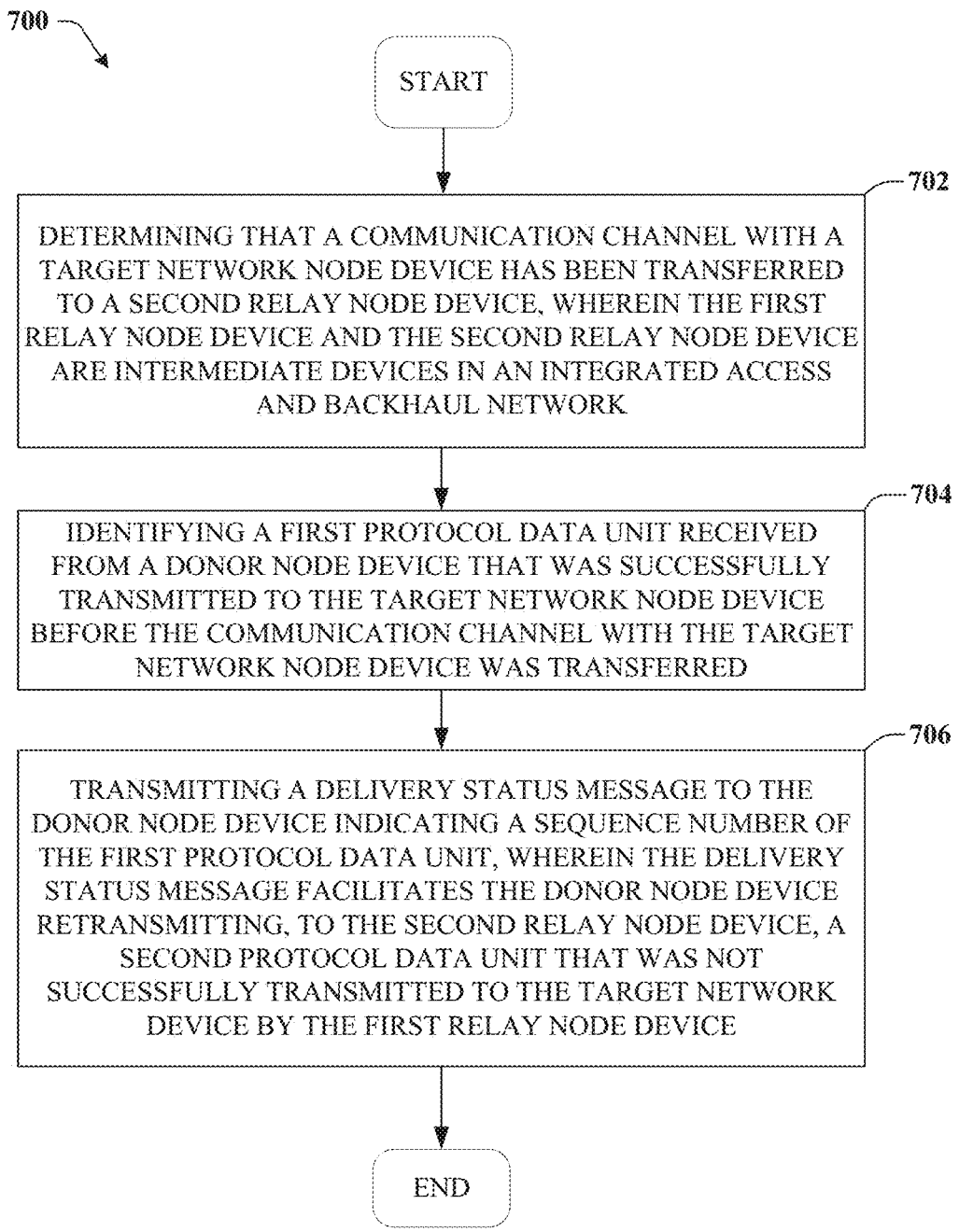
FIG. 7 illustrates an example method for informing a parent node about undelivered protocol data units after a handover procedure in accordance with various aspects and embodiments of the subject disclosure.
Figure 8:
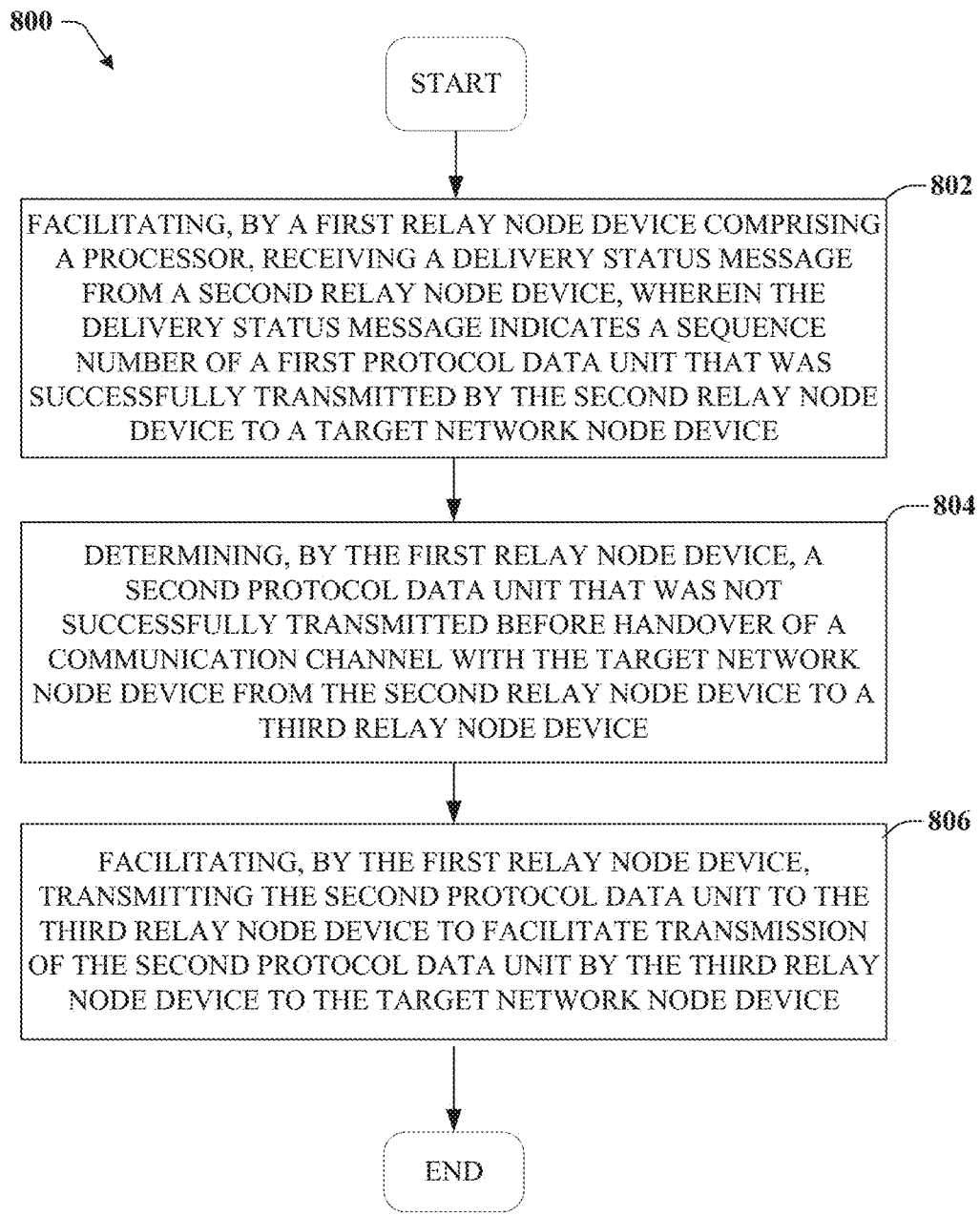
FIG. 8 illustrates an example method for retransmitting undelivered protocol data units after a handover procedure in accordance with various aspects and embodiments of the subject disclosure

FIGS. 6-8 illustrates a process in connection with the aforementioned systems. The processes in FIGS. 6-7 can be implemented for example by the systems in FIGS. 1-5. In particular, FIG. 3 corresponds to FIG. 6, FIG. 4 corresponds to FIG. 7, and FIG. 5 corresponds to FIG. 8. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 6 illustrates an example method 600 for applying facilitating route changes in an integrated access and backhaul network in accordance with various aspects and embodiments of the subject disclosure.

Method 600 can begin at 602 where the method includes determining to facilitate initiation of a handover of a first communication channel to a source network node device from a first network node device to a second network node device, wherein the first network node device and the second network node device are donor node devices of the source network node device.

At 604, the method includes transmitting a message to a third network node device that is a parent node device of the first network node device and the second network node device in a hierarchical group of network node devices, wherein the message comprises an instruction to the third network node device to forward data directed to the source network node device via the second network node device.

FIG. 7 illustrates an example method 700 for informing a parent node about undelivered protocol data units after a handover procedure in accordance with various aspects and embodiments of the subject disclosure.

Method 700 can begin at 702 where the method includes determining that a communication channel with a target network node device has been transferred to a second relay node device, wherein the first relay node device and the second relay node device are intermediate devices in an integrated access and backhaul network.

At 704, the method includes identifying a first protocol data unit received from a donor node device that was successfully transmitted to the target network node device before the communication channel with the target network node device was transferred.

At 706, the method includes transmitting a delivery status message to the donor node device indicating a sequence number of the first protocol data unit, wherein the delivery status message facilitates the donor node device retransmitting, to the second relay node device, a second protocol data unit that was not successfully transmitted to the target network device by the first relay node device.

FIG. 8 illustrates an example method 800 for retransmitting undelivered protocol data units after a handover procedure in accordance with various aspects and embodiments of the subject disclosure.

Method 800 can begin at 802 where the method includes facilitating, by a first relay node device comprising a processor, receiving a delivery status message from a second relay node device, wherein the delivery status message indicates a sequence number of a first protocol data unit that was successfully transmitted by the second relay node device to a target network node device.

At 804, the method includes determining, by the first relay node device, based on the delivery status message, a second protocol data unit that was not successfully transmitted before handover of a communication channel with the target network node device from the second relay node device to a third relay node device.

At 806, the method includes facilitating, by the first relay node device, transmitting the second protocol data unit to the third relay node device to facilitate transmission of the second protocol data unit by the third relay node device to the target network node device.

Figure 9:
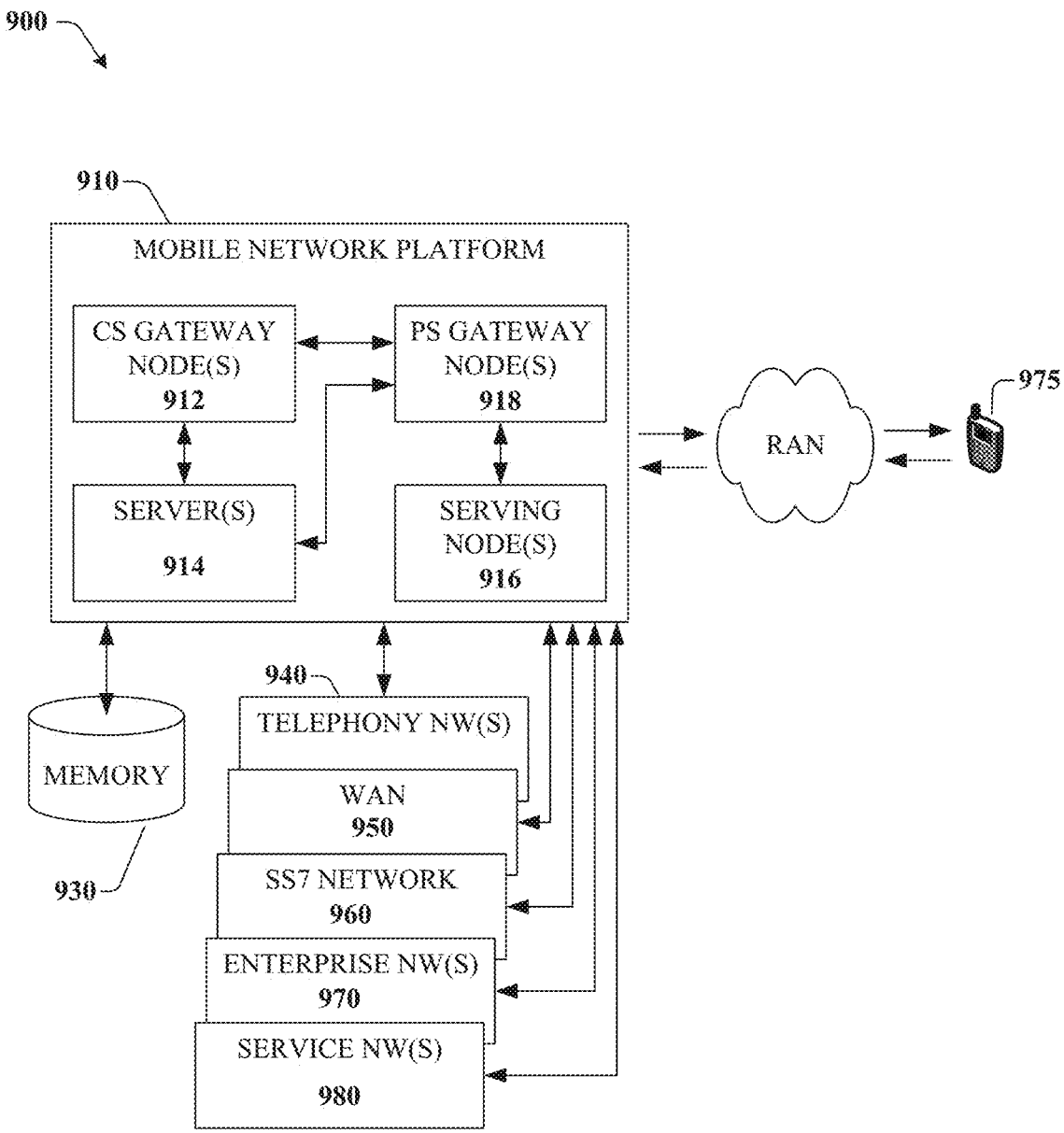
FIG. 9 illustrates an example block diagram of a non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
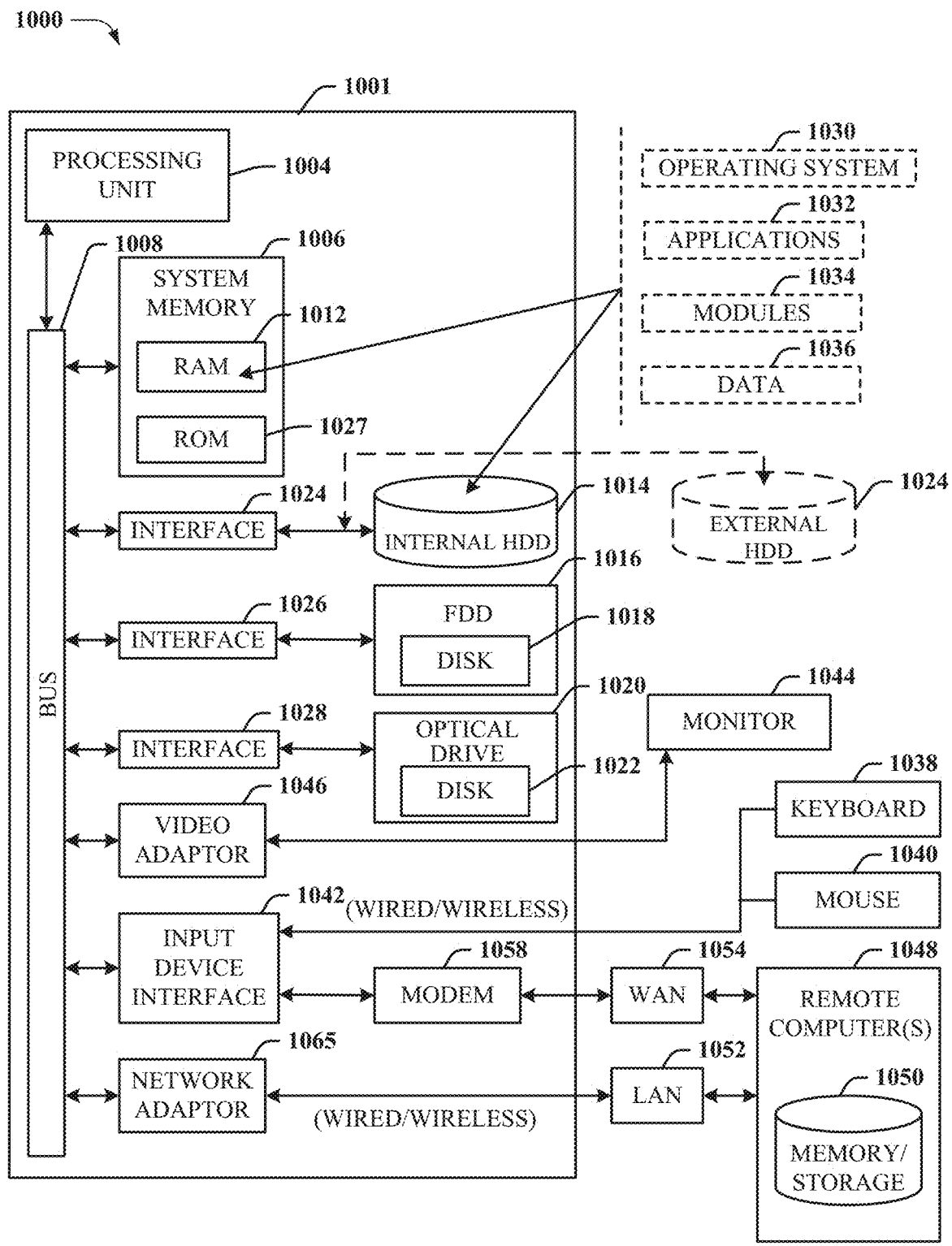
FIG. 10 illustrates an example block diagram of a computer that can be operable to execute processes and methods in accordance with various aspects and embodiments of the subject disclosure

Referring now to FIG. 10, there is illustrated a block diagram of a computer 1000 operable to execute the functions and operations performed in the described example embodiments. For example, a network node (e.g., network node 106, base station device 502, e.g.,) may contain components as described in FIG. 10. The computer 1000 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. Centralized unit network equipment, comprising:
a processor; and
a memory that stores executable instructions that, when executed by the processor, facilitate performance of operations, comprising:
determining, based on radio resource management data associated with source network node equipment, to facilitate initiation of a handover of a first communication channel from first network node equipment to second network node equipment, wherein the first network node equipment and the second network node equipment are donor node equipment of the source network node equipment, and wherein the radio resource management data is indicative of network condition information between the first network node equipment and the second network node equipment; and
transmitting a message to third network node equipment that is parent node equipment of the first network node equipment and the second network node equipment in a hierarchical group of network node equipment, wherein the message comprises an instruction to the third network node equipment to forward data directed to the source network node equipment via the second network node equipment, wherein the data directed to the source network node equipment comprises first data representative of received data that was received by the first network node equipment and second data representative of missing data that was not received by the first node equipment, and wherein the second data is retrieved from a buffer associated with the third network node equipment and is forwarded to the source network equipment via the second network node equipment based on a facilitated comparison, by the third network node equipment, of first sequence numbers associated with the first data and second sequence numbers associated with the second data.

2. The centralized unit network equipment of claim 1, wherein the network condition information is first network condition information, and wherein the radio resource management measurement data comprises second network condition information for a user equipment associated with the second network node equipment.

3. The centralized unit network equipment of claim 1, wherein the operations further comprise:
receiving the radio resource management measurement data from the source network node equipment.

4. The centralized unit network equipment of claim 1, wherein the determining to facilitate the initiation of the handover is performed by a topology manager component of the centralized unit network equipment.

5. The centralized unit network equipment of claim 1, wherein the instruction is a first instruction, and wherein the operations further comprise:

transmitting a second instruction to the second network node equipment to initiate the handover from the first network node equipment.

6. The centralized unit network equipment of claim 1, wherein the instruction is a first instruction, and wherein the operations further comprise:
transmitting a second instruction to the source network node equipment to initiate a second communication channel with the second network node equipment.

7. The centralized unit network equipment of claim 1, wherein the first network node equipment and the second network node equipment have a same hop order in an integrated access and backhaul network.

8. The centralized unit network equipment of claim 1, wherein the operations further comprise:
determining that the handover was successful; and
transmitting a first route update message indicating a first communication path to the source network node equipment and instructing a stopped network node equipment to start forwarding data to the source network node equipment via the first communication path.

9. The centralized unit network equipment of claim 8, wherein the operations further comprise:
determining that the handover failed; and
transmitting a second route update message instructing the stopped network node equipment to start the forwarding of the data directed to the source network node equipment via a second communication path.

10. A method, comprising:
facilitating, by network equipment comprising a processor, a handover of a first communication channel from first network equipment to second network equipment based on radio resource management data associated with source network equipment, wherein the first network equipment and the second network equipment are nodes of the source network equipment, and wherein the radio resource management data is indicative of network condition information between the first network equipment and the second network equipment; and
transmitting, by the network equipment, a message to third network equipment that is a node of the first network equipment and the second network equipment in a hierarchical group of network equipment, wherein the message comprises an instruction to the third network equipment to forward data directed to the source network equipment via the second network equipment, wherein the data directed to the source network equipment comprises first data that was received by the first network equipment and second data that was not received by the first network equipment, and wherein the instruction facilitates the third network equipment to retrieve, from an associated buffer, the second data, and further facilitates the second network equipment to forward the second data to the source network equipment based on comparing, by the third network equipment, first sequence numbers associated with the first data and second sequence numbers associated with the second data.

11. The method of claim 10, further comprising:
receiving, by the network equipment, the radio resource management measurement data from the source network equipment.

12. The method of claim 10, further comprising:
transmitting, by the network equipment, a different message to the second network equipment to initiate the handover from the first network equipment.

13. The method of claim 10, further comprising:
transmitting, by the network equipment, a different message to the source network equipment to initiate a second communication channel with the second network equipment.

14. The method of claim 10, further comprising:
determining that the handover was successful; and
transmitting, by the network equipment, a first route update message indicating a first communication path to the source network equipment and instructing stopped network equipment to start forwarding data to the source network equipment via the first communication path.

15. The method of claim 14, further comprising:
determining that the handover failed; and
transmitting, by the network equipment, a second route update message instructing the stopped network equipment to start the forwarding of the data directed to the source network equipment via a second communication path.

16. A non-transitory machine-readable medium, comprising executable instructions that, when executed by a processor, facilitate performance of operations, comprising:
initiating, based on radio resource management data associated with source network node equipment, a handover of a first communication channel from first network node equipment to second network node equipment, wherein the first network node equipment and the second network node equipment are associated with the source network node equipment, and wherein the radio resource management data is indicative of network condition information between the first network node equipment and the second network node equipment; and
transmitting a message to third network node equipment in a hierarchical group associated with the first network node equipment and the second network node equipment, wherein the first network node equipment is a first defined hop distance in the hierarchical group from the third network node equipment, the second network node equipment is a second defined hop distance in the hierarchical group from the third network node equipment and the first defined hop distance is greater than the second defined hop distance, wherein the message comprises an instruction to forward data directed to the source network node equipment via the second network node equipment, wherein the data directed to the source network node equipment comprises first data that was transmitted via the first network node equipment and second data that was not transmitted via the first network node equipment, and wherein the instruction facilitates the third network node equipment to identify the second data based on a comparison, facilitated by the third network node equipment, of first sequence numbers associated with the first data and second sequence number associated with the second data.

17. The non-transitory machine-readable medium of claim 16, wherein the instruction is a first instruction, and wherein the operations further comprise:
transmitting a second instruction to the second network node equipment to initiate the handover from the first network node equipment.

18. The non-transitory machine-readable medium of claim 16, wherein the instruction is a first instruction, and wherein the operations further comprise:
transmitting a second instruction to the source network equipment to initiate a second communication channel with the second network node equipment.

19. The non-transitory machine-readable medium of claim 16, wherein the operations further comprise:
determining that the handover was successful; and
transmitting a first route update message indicating a first communication path to the source network equipment.

20. The non-transitory machine-readable medium of claim 16, wherein the operations further comprise:
determining that the handover failed; and
initiating the forwarding of the data directed to the source network node equipment via a second communication path.

* * * * *